Patented May 6, 1952

2,595,415

UNITED STATES PATENT OFFICE 2,595,415

PRODUCTION OF AN ACTIVATED FORM OF ALUMINA

Louis Schmerling, Riverside, Ill., assignor to Universal Oil Products Company, Chicago, Ill., a corporation of Delaware No Drawing. Application September 29, 1948, Serial No. 51,853

8 Claims. (Cl. 23—142)

This invention relates to a method for the production of a catalytically active and adsorptive form of alumina which when utilized individually or as a composite with other promoting substances provides an exceptionally active contacting agent as compared to presently available forms of alumina. More specifically, the invention concerns a method for the production of an improved alumina product from an intermediate basic aluminum acid compound capable of undergoing thermal disassociation or oxidation to form a pure low density form of alumina, particularly effective as an adsorbent, catalytic agent and catalyst support. This application is related to my copending application Serial No. 51,855, filed September 29, 1948.

Alumina, either as the hydrate or in the anhydrous form as aluminum oxide, has been widely used in the art for many chemical conversion reactions in which a contact agent is essential or advantageous to the reaction. It has been employed, for example, as an adsorbent for the removal of foreign substances from liquids and gases, as in the removal of volatilized liquids from gases contaminated therewith. The oxide is also widely used as a dehydrating agent in processes for chemically dehydrating alcohols to form olefins, as in the manufacture of cyclohexene by the dehydration of cyclohexanol, dehydrohalogenation reactions to form unsaturates, and many other typical reactions. The activated forms of alumina which are considered to be merely various physical modifications of aluminum oxide are known for their pronounced catalytic activity and high adsorptive capacity. They are particularly useful in promoting hydrocarbon conversion reactions and hence are utilized in the petroleum industry as catalysts or as a catalyst component. Alumina may be composited with other catalytically active metals or metallic compounds to form thereby catalyst composites for promoting selected conversion reactions in which the alumina component of the catalyst acts either as a support for the catalytically active component or as a promoter to enhance the activity of one or more other components. Typical of such uses for alumina is the production of an alumina supported nickel catalyst where the nickel is deposited in a finely divided state on the exposed surface of a porous alumina support, such as the alumina product of the present process.

In the above uses of alumina, the highly adsorptive or activated forms of material are desirable and in many cases essential to obtain the desired effect therefrom. Many types of aluminas and so-called aluminas presently available, however, do not have the preferred or essential physical characteristics for use in the intended conversion reactions, particularly the adsorptive capacity and catalytic activity of the so-called "activated" form of alumina. Among the relatively inactive forms of alumina are the alumina hydrates containing 1, 2 or 3 moles of water of crystallization per mole of alumina or anhydrous alumina and the mono-, di- or trihydrate as a complex aggregate. The latter, commercial grades of alumina ore, including various crystalline modifications such as Gibbsite, bauxite, Bohmite, diaspore and others are among the naturally occurring forms of alumina which in their original condition are not catalytically active as such and comprise the group of aluminas containing gamma-alumina which may be treated in accordance with the present process for conversion into the present purified and highly activated alumina product.

Many aluminas presently available on the market and/or available from natural sources contain components other than alumina which may be considered as impurities because of their deleterious effect, in many cases, on the catalytic or absorptive properties of the alumina component. Thus, many aluminas offered on the market contain iron (generally as iron oxide), sodium, silicon, calcium, barium, etc. which in many catalytic uses seriously reduce the activity and/or thermal stability of the alumina for the purposes intended. A silica-alumina composite containing sodium or iron, for example, is not as active as a cracking catalyst and is not as resistant to high temperatures as is the corresponding silica-alumina catalyst in which the sodium or iron contaminants are absent. The present invention has as one of its primary objectives the preparation of an activated form of alumina utilizing an inexpensive source of the alumina starting material which in its original form is generally substantially inactive or only partially active as a contact agent. Another object of the invention is to provide a process for removing a major proportion of the non-alumina impurities from an alumina ore comprising gamma-alumina oxide.

It is not contemplated herein to utilize as the alumina-containing starting material for treatment in accordance with the present process, a substance comprising wholly or in a substantial proportion thereof the refractory or condensed form of alumina designated in the literature as alpha-alumina which characterizes the structure of fused alumina appearing in such materials as rubies, sapphires, corundum, etc. The latter are apparently inert to the acidic reagent utilized in the present method of treatment and are not, therefore, to be considered within the intended scope of the term "gamma-alumina" as the starting material of the present process.

The process comprising the present invention involves the conversion of alumina starting material containing gamma-alumina as a major component thereof to a basic aluminum acid salt and thereafter converting the recovered salt by means of calcination or an oxidative thermal treatment to a catalytically active, adsorbent form of alumina comprising the present product.

In accordance with one of its embodiments the present invention concerns a process for the preparation of an activated form of alumina having a low density and a large superficial area per unit weight which comprises reacting an alumina containing gamma-aluminum oxide with a theoretical excess of organic acid containing at least 60% by weight of said acid at a temperature in excess of about 150° C., up to about 300° C., for a time sufficient to convert said gamma-alumina to the corresponding basic aluminum salt of said acid and thereafter heating said salt for a time and at a temperature sufficient to displace the organic acid group and form aluminum oxide therefrom.

Another embodiment of the invention relates to a process for the production of an activated form of alumina which comprises reacting an alumina containing gamma-aluminum oxide with a molar excess of acetic acid of at least 60% by weight concentration to form monobasic aluminum acetate, recovering said acetate salt from the excess of said acetic acid and calcining said salt at a temperature of from about 350° to about 650° C. to form said activated alumina.

Other objects and embodiments of the present invention will be referred to more specifically in the following further description thereof.

The production of the basic aluminum acid salt which comprises the intermediate product of the present process from which the present activated alumina product is prepared involves a series of reaction stages which comprises mixing an alumina starting material containing gamma-aluminum oxide, such as the least expensive natural source of alumina, the trihydrate, with an organic acid of at least 60% by weight concentration (preferably a low molecular weight member of the fatty acid series, such as formic and acetic acids) in a quantity corresponding to an excess over the theoretical molar ratio required for converting said alumina to the monobasic acid salt thereof. The mixture of acid and alumina starting material is thereafter heated at a temperature in excess of about 150° C., up to about 300° C., preferably up to about 220° C. while maintaining the pressure sufficiently superatmospheric to maintain at least a portion of the acidic reactant in liquid phase. The reaction period required to convert the alumina to the aluminum salt of the acid varies with the particular acid selected and may require from about 0.5 to about 20 hours. The reaction for the formation of the basic aluminum acid salt is represented, for example, in the following equation in which acetic acid represents the organic acid reactant:

$$Al_2O_3 + 4HOOCCH_3 \rightarrow 2HOAl(OOCCH_3)_2 + H_2O$$

The corresponding reaction using an aluminum oxide trihydrate is represented in the following equation:

$$Al_2O_3 \cdot 3H_2O + 4HOOCCH_3 \rightarrow$$
$$2HOAl(OOCCH_3)_2 + 4H_2O$$

Suitable organic acids utilizable in the present reaction to form the basic aluminum acid salt include acetic acid and formic acid which, for reasons hereinafter specified are the preferred treating agents, trichloracetic acid, dichloracetic acid, monochloroacetic acid, oxalic acid, malonic acid, succinic acid, tartaric acid and others. Formic acid and acetic acid containing at least 60% by weight of the acid in the reagent are preferred, not only because of their relatively low cost, but further, because of their effectiveness in yielding the desired basic aluminum acid compound thereof in substantially quantitative yields. Treating agents containing less than about 60% by weight of the organic acid do not effect the desired conversion either at a practical rate or to a practical extent, the rate of conversion and the proportion of alumina converted to the acid salt increasing as the concentration of the reagent approaches the anhydrous acidic reagent. In the use of anhydrous formic and acetic acids, conversion to the corresponding basic aluminum acid salts was practically quantitative when the reaction conditions were maintained as above specified. At least four molecular proportions of acid to alumina must necessarily be charged into the reaction mixture to provide for the production of the monobasic acid salt, and preferably this ratio of organic acid to alumina is above the theoretical requirement, from about 6 to 1 to about 12 to 1 in order to obtain maximum conversion at a reasonable rate.

The treatment of the charged alumina to form the basic aluminum acid salt comprising the intermediate product of the present process is effected at a temperature above about 150° C., preferably, from about 180° to about 250° C. while maintaining the acid reagent in substantially liquid phase by utilizing superatmospheric pressure. At lower temperatures than about 150° C. the conversion of the alumina is sluggish and incomplete, the product, even after long reaction periods, containing an appreciable quantity of unconverted alumina charging material.

The basic aluminum acid salt prepared by the process of the above description is recovered from the excess organic acid reagent utilized in the preparation of the salt by any convenient method of separation, for example, by filtration, since the basic aluminum acid salt is generally insoluble in the excess liquid organic acid. The product, which is generally a white, granular solid retained on the filter may be utilized directly without further treatment in the present process or the salt may be heated and/or subjected to vacuum distillation to remove the traces of acid remaining on the salt. Since the salt is relatively insoluble in water at room temperature an alternative procedure for recovery of the salt comprises merely washing the filter cake to wash away the excess acid. The organic acid salts of most of the impurities such as sodium, iron, etc., if any, present in the alumina ore utilized as starting material, which was charged to the initial reaction for the production of the basic aluminum acid salt are soluble in the excess acid and are therefore normally found in the filtrate. The impurities are thus separated from the basic aluminum acid salt and the procedure thereby provides for the ultimate production of a highly purified alumina by calcination of the acid salt in accordance with the present process. In general, it is not essential to remove the last traces of organic acid from the basic aluminum acid salt prior to the subsequent calcination, since in this treatment, the residual acid remaining on the surface of the salt particles is either oxidized or vaporized at the temperatures and in the presence of the oxygen employed in this operation.

The calcination treatment comprising the essential operation of the present process whereby an activated alumina product is formed by heating a basic aluminum acid salt at temperatures sufficient to remove the organic acid radical and form the aluminum oxide therefrom is effected at temperatures in excess of about 250° C. up to about 800° C. and at pressures sufficient to result in the removal of the organic acid radical from the basic aluminum acid salt. The salt may be heated in an atmosphere of an oxygen-containing gas and in such manner that maximum exposure of the particles of salt to the oxygen is obtained during the heating operation. The presence of the oxygen-containing atmosphere during calcination reduces the tendency of the organic portion of the basic aluminum acid salt to carbonize and thus leave a deposit of carbon in the finished catalyst product. For this purpose, pure oxygen is highly effective, although air which may be enriched with oxygen may also be utilized. The basic aluminum acid salt is preferably spread as a thin layer over the heating surface or it may be suspended by a fluidization technique in a flowing stream of the oxygen-containing gas heated to the desired calcination temperature. An alternative method of operation comprises heating a mass of the basic aluminum acid salt in an inert atmosphere, and thereafter suspending the product to the oxygen-containing gas. The first stage of the latter indicated process is desirably effected at a temperature of from about 250° to about 400° C. and the latter stage at somewhat higher temperatures of from about 350° to about 800° C. Organic products, for example, acetone in the case of basic aluminum acetate, are formed as by-products in the first stage. One advantage of effecting the calcination operation throughout in the presence of the oxygen-containing atmosphere, however, is to substantially reduce the total time required for the operation and to reduce said carbonization.

The product of the present process is a white fluffy material of low density, having a highly porous structure and an exceptionally high ratio of exposed superficial area per unit man, making the product especially adaptable for use in contact processes where its large superficial area available for contact with the reactant is advantageous in promoting the rate of reaction. The apparent bulk density or mass per unit volume of the material, nevertheless, may be reduced, where desired, by wet grinding the initial product of the calcination and subsequently drying to form a cake having a higher density than the original calcined alumina.

The alumina product of this invention may be utilized as heretofore indicated as an adsorbent for the removal of vapors from normally gaseous material, as a catalyst in its own right for such typical conversion reactions as for example, the dehydration of alcohols to form olefins, as a catalyst support for other catalytically-active promoting substances, such as, the typical case of a nickel-alumina catalyst composite, and for many other uses generally known to the art. In general, the preparation of alumina composites with other promoting substances, such as silica, chromia, nickel-oxide, copper-oxide, etc., may be effected by impregnating the present calcined alumina product with a salt of the promoting metal dissolved in a liquid carrier and thereafter converting the salt, if desired, to the oxide or to the metallic element itself. Thus, in the preparation of a silica-alumina cracking catalyst the alumina product may be commingled with an aqueous solution of an alkali metal silicate, such as common water glass, and the mixture treated with a mineral acid, such as hydrochloric acid, to precipitate silica on the alumina particles. The solid (a mixture or composite of the respective alumina and silica gels), is recovered, for example, by filtration, the filter cake washed to remove soluble impurities, particularly alkali metal ions, dried, and calcined at approximately 500° to about 800° C. to form the final catalyst composite. Additional treatment of the composite prior to or following the drying and/or calcination stages such as acid washes and treatment with aqueous ammonium salt solutions are well known to the art and may be applied to the production of the present catalysts as well.

In the preparation of another typical alumina-containing catalyst composite comprising an alumina-supported nickel catalyst which is useful in catalyzing hydrogenation and dehydrogenation reactions, depending upon the operating conditions selected, the alumina product of the present process or an aqueous suspension thereof is intimately commingled with an aqueous solution of a nickel salt, such as nickel chloride, to impregnate the alumina particles with said salt solution. The resulting alumina impregnated with the nickel salt may then be treated with, for example, ammonium carbonate to precipitate nickel carbonate within the alumina support, the product then filtered, the recovered filter cake dried and calcined, for example, in the presence of an oxygen-containing atmosphere to form a nickel oxide-alumina composite, or, in the presence of hydrogen, to form an alumina-supported metallic nickel catalyst.

An alumina-chromia catalyst useful in dehydrogenation reactions is prepared by methods similar to the above procedure by impregnating the dried calcined alumina herein obtained or a water-suspended mixture of the alumina with a chromium salt, such as chromium sulfate, followed by precipitating chromium hydroxide on the alumina particles by treating the impregnated alumina gel with a basic reagent, preferably ammonium hydroxide or carbonate, filtering the composite, and drying and calcining the same to form particles of the final catalyst composite.

Other than its use for catalytic and contact purposes hereinabove described, the present alumina product may be employed as a mordant in dyeing operations; in compounding synthetic rubbers where the alumina may be added as a whitening component, or as a filler for rubber; in the preparation of pigments for paints, etc.; in the formulation of pharmaceuticals and in cosmetic preparations. Many other uses of the present product in instances where a highly porous, low density or a catalytically active form of alumina is desired, definitely establish the utility of the alumina product of this invention.

The hereinabove described process is further illustrated in the following examples which are cited for purposes of illustration with no intent, however, to limit the scope of the invention in accordance therewith.

EXAMPLE I

*Formation of a basic aluminum acid salt*

10 parts by weight of anhydrous alumina (a product of the Hawshaw Chemical Company) was heated with 103 parts by weight of glacial acetic acid at a temperature of 180° C. and at a pressure of 50 atmospheres of nitrogen in a rotating autoclave for 6 hours. The contents of the autoclave were thereafter cooled and filtered and the filter cake dried at 100° C. to remove the last traces of acetic acid from the solid residue. The yield of product, which is a granular white salt, insoluble in water, was approximately 28 parts by weight.

*Calcination of basic aluminum acetate*

56 parts by weight of the white granular salt formed in accordance with the above procedure and on analysis having a composition corresponding to basic aluminum acetate was placed in a horizontal furnace and heated to a temperature of approximately 380° to about 400° C., while gaseous nitrogen was passed through the furnace over the surface of the aluminum salt. The salt was heated for about 2 hours and during the calcination the gaseous effluent of the furnace was led through an ice trap to liquefy the condensible vapors therefrom. The calcination residue remaining in the horizontal tube of the furnace was then heated at a temperature of from about 550° to about 560° C. for 18 hours, the residue consisting essentially of alumina in the form of a low density, porous powdery material.

The total liquid product consisted of 21 cc. of liquid collected at 0° C. and distillation thereof indicated that it was chiefly a mixture of acetone and acetic acid.

EXAMPLE II

Calcination of a basic aluminum acetate salt produced in accordance with the process of Example I in the presence of air yielded a product consisting of substantially pure alumina. The initial calcination was effected by placing the basic aluminum acetate salt in a horizontal furnace and heating the salt to a temperature of about 400° C. while air was passed through the furnace. The salt was heated for about 2 hours and during the calcination the gaseous effluent was led through a trap to condense the vapors therefrom. The residue from the original calcination at 400° C. in the presence of air was thereafter heated at a temperature of approximately 600° C. for 18 hours also in the presence of air to oxidize the carbonaceous residue deposited in the calcined alumina product. The recovered alumina product was a porous material which was substantially whiter than the alumina product of Example I. The gaseous effluent of the reaction consisted of almost entirely noncondensible gases comprising chiefly carbon dioxide.

I claim as my invention:

1. A process which comprises commingling an alumina containing gamma-aluminum oxide with a carboxylic acid of at least 60% by weight concentration and in an amount corresponding to at least four molecular proportions of acid to alumina, heating the resultant mixture to a temperature of from about 150° C. to about 300° C. under sufficient superatmospheric pressure to maintain a substantial portion of the acid in liquid phase and for a time sufficient to convert said gamma-aluminum oxide to a basic aluminum salt of said acid, and thereafter heating said salt at a temperature of from about 250° C. to about 800° C. for a time sufficient to remove the organic acid radical from said salt and to form a porous alumina.

2. The process of claim 1 further characterized in that said salt is heated in an oxygen-containing atmosphere.

3. The process of claim 1 further characterized in that said acid is acetic acid.

4. The process of claim 1 further characterized in that said alumina is a naturally occurring alumina ore containing gamma-aluminum oxide as a major component.

5. A process which comprises commingling an alumina containing gamma-aluminum oxide with a carboxylic acid of at least 60% by weight concentration and in an amount corresponding to at least four molecular proportions of acid to alumina, heating the resultant mixture to a temperature of from about 150° C. to about 300° C. under sufficient superatmospheric pressure to maintain a substantial portion of the acid in liquid phase and for a time sufficient to convert said gamma-aluminum oxide to a basic aluminum salt of said acid, heating said basic aluminum salt at an initial temperature of from about 250° to about 400° C. for a time sufficient to volatilize the organic portion of said basic aluminum salt and thereafter calcining the product of the initial heating at a temperature of from about 350° C. to about 800° C. to form a product comprising substantially alumina.

6. The process of claim 5 further characterized in that said salt is heated and the resultant product calcined in an oxygen-containing atmosphere.

7. The process of claim 5 further characterized in that said acid is acetic acid.

8. The process of claim 5 further characterized in that said alumina is a naturally occurring alumina ore containing gamma-aluminum oxide as a major component.

LOUIS SCHMERLING.

REFERENCES CITED

The following references are of record in the file of this patent:

UNITED STATES PATENTS

| Number | Name | Date |
|---|---|---|
| 59,238 | Lewis | Oct. 30, 1866 |
| 485,461 | Dewey | Nov. 1, 1892 |
| 1,132,709 | Eichelbaum | Mar. 23, 1915 |
| 2,019,415 | Jochem et al. | Oct. 29, 1935 |
| 2,390,272 | Riesmeyer et al. | Dec. 4, 1945 |
| 2,411,806 | Riesmeyer et al. | Nov. 26, 1946 |

OTHER REFERENCES

"Acid Processes for the Extraction of Alumina," Bureau of Mines Bulletin #267, p. 78, (1927).